United States Patent
Watanabe

(10) Patent No.: US 7,570,428 B2
(45) Date of Patent: Aug. 4, 2009

(54) MULTILAYER MINUS FILTER AND FLUORESCENCE MICROSCOPE

(75) Inventor: Tadashi Watanabe, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 394 days.

(21) Appl. No.: 11/174,628

(22) Filed: Jul. 6, 2005

(65) Prior Publication Data

US 2006/0007548 A1    Jan. 12, 2006

(30) Foreign Application Priority Data

Jul. 7, 2004    (JP)    ............................. 2004-200701

(51) Int. Cl.
*G02B 1/10*    (2006.01)

(52) U.S. Cl. .................. 359/586; 359/589; 359/584

(58) Field of Classification Search .................. None
See application file for complete search history.

(56) References Cited

U.S. PATENT DOCUMENTS 5,400,174 A    3/1995    Pagis et al.
2002/0154387 A1    10/2002    Mori et al.

FOREIGN PATENT DOCUMENTS

| JP | 05-215916 | 8/1993 |
|---|---|---|
| JP | 2001-123467 | 10/2002 |
| JP | 2002-319727 | 10/2002 |
| JP | 2002-018713 | 7/2003 |
| JP | 2003-215332 | 7/2003 |

*Primary Examiner*—Arnel C Lavarias
(74) *Attorney, Agent, or Firm*—Kenyon & Kenyon LLP

(57) ABSTRACT

A multilayer minus filter for reflecting a light having a predetermined wavelength and transmitting a light having a wavelength longer than and shorter than the predetermined wavelength, includes a repetition layer such that a sum of an average value of optical thickness of a high refractive index layer and an average value of optical thickness of a low refractive index layer is substantially equal to a reflection wavelength $\lambda_0$ with respect to a vertically incident light, wherein, when a rate H/L between the optical thickness H of the high reflective index layer and the optical thickness L of the low reflective index layer in the repetition layer of the high refractive index layer and the low refractive index layer is larger than 0.5 and smaller than 2, a reflection band formed in the reflection wavelength $\lambda_0$ by the repetition layer is utilized.

12 Claims, 5 Drawing Sheets

MULTILAYER MINUS FILTER AND FLUORESCENCE MICROSCOPE

CROSS-REFERENCE TO RELATED APPLICATIONS

This application is based upon and claims the benefit of priority from prior Japanese Patent Application No. 2004-200701, filed Jul. 7, 2004, the entire contents of which are incorporated herein by reference.

BACKGROUND OF THE INVENTION

1. Field of the Invention

The present invention relates to a multilayer minus filter adopted to separate a light having a narrow wavelength bandwidth by stopping or reflecting the light having the narrow wavelength bandwidth and transmitting other wavelengths, and a fluorescence microscope using the multilayer minus filter.

2. Description of the Related Art

A fluorescence microscope observation is widely used for fundamental research such as medical, dental, pharmaceutical, and biological studies; for testing and research such as clinical health test, animal health, and plant diseases: and for the industrial fields associated with chemicals, pharmaceuticals, semiconductors and the like. Recently, this observation has been an essential technique in the field of genome analysis in molecule biology, and has been more and more important.

A fluorescence microscope is a microscope which determines a substance from an object configuration, or its tone and strength by utilizing fluorescence generated when strong light (excitation light) is emitted to the object. In order to separate the fluorescence, an optical multilayer filter has been widely used conventionally. Because the wavelength of the fluorescence is longer than the wavelength of the excitation light, it has been sufficient if a light (excitation light) having a short wavelength and a light (fluorescence) having a long wavelength can be separated by the conventional optical multilayer filter for use in fluorescence observation.

In contrast, in the recent research of molecule biology, there has been growing need for observing a dynamic behavior of a living cell. Thus, apart from the light for use in excitation or observation of a fluorescence substance, a light for operating a cell (operating light) may be used or a light for stimulating a cell and seeing its reaction (stimulating light) may be used. In such a case, there is a demand for such an optical multilayer filter which cuts the operating light and stimulating light and transmits a light having another wavelength efficiently (hereinafter, referred to as a "minus filter"). In addition, in the similar field, there is a need for simultaneously observing plural kinds of fluorescence lights and precisely observing interaction in cells or layouts of a plurality of observation objects by using lights having a plurality of wavelengths for excitation of a fluorescence substance.

In this case also, there is a demand for such a filter (minus filter) which efficiently transmits both of the wavelengths which are shorter and longer than the excitation light while stopping the excitation light. In the minus filter used in both of these cases as well, the wavelength bandwidth of the lights to be stopped or reflected is often required to be sufficiently narrow.

The conventional minus filters are as follows:

Jpn. Pat. Appln. KOKAI Publication No. 5-215916 discloses a minus filter including a polymeric interference stack in order to protect an eye or other sensors from an undesirable bright light emitted from a light source.

Jpn. Pat. Appln. KOKAI Publication No. 2002-319727 discloses a minus filter using an interference stack formed by alternately laminating dielectric thin films having a small refractive index difference with the same optical thickness ($\lambda/4$ when a reflection wavelength is defined as $\lambda$) in order to flatten gain spectra of an optical amplifier for use in an optical communication system.

In Jpn. Pat. Appln. KOKAI Publication No. 2003-215332, there is described a minus filter using an interference stack utilizing high order reflection when dielectric thin films are alternately laminated with the same optical thin film for the purpose which is similar to that described in Jpn. Pat. Appln. KOKAI Publication No. 2002-319727.

BRIEF SUMMARY OF THE INVENTION

The present invention provides a minus filter having a very narrow reflection bandwidth and selectivity of the reflection bandwidth.

A multilayer minus filter for reflecting a light having a predetermined wavelength and transmitting a light having a wavelength longer than and shorter than the predetermined wavelength, according to one aspect of the invention is characterized by comprising: a repetition layer such that a sum of an average value of optical thickness of a high refractive index layer and an average value of optical thickness of a low refractive index layer is substantially equal to a reflection wavelength $\lambda_0$ with respect to a vertically incident light, wherein, when a rate H/L between the optical thickness H of the high reflective index layer and the optical thickness L of the low reflective index layer in the repetition layer of the high refractive index layer and the low refractive index layer is larger than 0.5 and smaller than 2, a reflection band formed in the reflection wavelength $\lambda_0$ by the repetition layer is utilized.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described with reference to the accompanying drawings.

Figure 1:
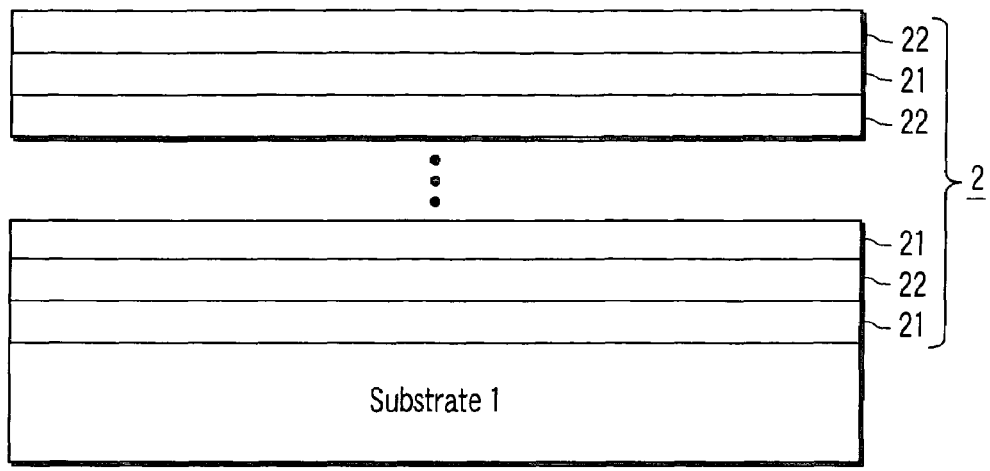
FIG. 1 is a view showing an optical element to which a multilayer minus filter according to the invention is applied.

FIG. 1 is a view showing an optical element to which a multilayer minus filter according to the invention is applied. As shown in FIG. 1, the multilayer minus filter according to the invention comprises an alternate layer 2 (hereinafter, referred to as a "repetition layer" in the present specification) in which a high refractive index layer 21 and a low refractive index layer 22 are alternately and repeatedly laminated on a substrate 1. The multilayer minus filter according to the invention, as described later in detail, is designed so that a sum of an average value of optical thickness of the high refractive index layer 21 and an average value of optical thickness of the low refractive index layer 22 in the repetition layer 2 is substantially equal to a reflection wavelength $\lambda_0$ with respect to a vertically incident light. Further, a rate H/L between the optical thickness H of the high refractive index layer 21 and the optical thickness L of the low refractive index layer 22 in the repetition layer 2 is greater than 0.5 and smaller than 2.

In the minus filter described in Jpn. Pat. Appln. KOKAI Publication Nos. 5-215916 and 2002-319727, a sum of optical thicknesses of a high refractive index layer and a low refractive index layer in a repetition layer portion of the high refractive index layer and the low refractive index layer when a wavelength to be reflected is defined as $\lambda$ is about 0.5$\lambda$, and a reflection band is formed by laminating a thin film having a configuration in which a rate of optical thickness between the high refractive layer and the low refractive layer is almost equal (1:1=0.25$\lambda$: 0.25$\lambda$). Also in Jpn. Pat. Appln. KOKAI Publication No. 2003-215332, the minus filter basically utilizes the similar configuration, and is different from that described in Jpn. Pat. Appln. KOKAI Publication Nos. 5-215916 and 2002-319727 in that an odd number order high harmonic component in the reflection band formed in $\lambda$ (formed in $\lambda$/m, wherein "m" is an odd number of 3 or more) is utilized.

In contrast, in the minus filter according to an embodiment of the invention, a sum of an average value of optical thickness of the high refractive index layer and an average value of optical thickness of the low refractive index layer is substantially equal to wavelength $\lambda$ to be reflected.

In addition, in the embodiment of the invention, the optical thicknesses of the high refractive index layer and the low refractive index layer are not equal to each other, and a reflection band (essentially equivalent to a secondary high harmonic component) is utilized which is generated by shifting a rate of optical thickness between the high refractive index layer and the low refractive index layer. That is, the embodiment of the invention utilizes a reflection band which is essentially different from a conventional reflection band utilized to form a minus filter. Incidentally, the reflection band formed by shifting the optical thicknesses of the high refractive index layer and the low refractive index layer according to the embodiment does not exist in a film configuration in which a rate of optical thickness utilized in Jpn. Pat. Appln. KOKAI Publication Nos. 5-215916 and 2003-215332 (in the case where a light incidence angle is vertical).

In designing an optical multilayer filter, in general, a repetition layer in which a high refractive index layer and a low refractive index layer are alternately and repeatedly laminated is expressed like: 0.5H 0.6L 0.4H 0.5L (0.5H 0.5L)$^S$ 0.5H 0.6L 0.4H 0.5L 0.5H . . . .

This expression is sequentially described from a later laminated on a substrate side. Symbols H and L indicate a high refractive index layer and a low refractive index layer, respectively. The number that precedes each of the symbols indicates how many times of optical thickness of the designed reference wavelength $\lambda$ the layer has when the designed reference wavelength is defined as $\lambda$. In addition, symbol S indicates that the parenthesized configuration is repeated S times.

In a basic configuration of the minus filter in the prior art, $(0.25H\ 0.25L)^S$ is obtained when a center wavelength of a reflection band is defined as a designed reference wavelength $\lambda$. In contrast, in a basic configuration of the minus filter according to the embodiment of the invention, for example, $(0.6H\ 0.4L)^S$ can be expressed when a center wavelength of a reflection band is defined as a designed reference wavelength $\lambda$. (H/L is defined as 1.5, wherein H is optical thickness of the high reflective index layer, and L is optical thickness of the low refractive index layer. This applies to the following case.) The embodiments of the invention are presented more specifically by using expression of the above-described optical multilayer filter film configuration.

Figure 2:
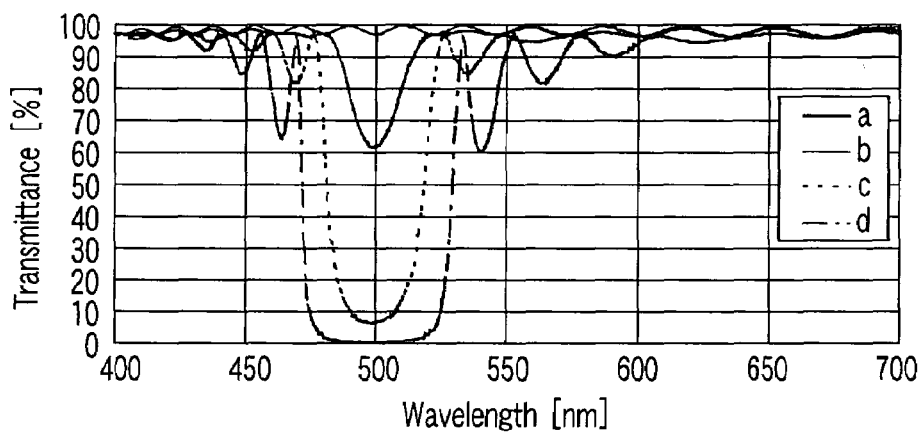
FIG. 2 is a view showing a spectral transmittance characteristic of an optical multilayer filter in each of film configurations (a), (b), (c), and (d).

FIG. 2 shows a spectral transmittance characteristic of an optical multilayer filter in each of the following film configurations (a), (b), (c), and (d). In the figure, it is presumed that a substrate is made of BK7 optical glass, and a final layer comes into contact with air. In the following film design excluding examples, it is presumed that all the substrates are made of BK7 optical glass, and the final layer comes into contact with air.

(a) $(0.5H\ 0.5L)^{10}\ 0.5H\ 0.25L$ ($\lambda$=500 nm)
(b) $(0.525H\ 0.475L)^{10}\ 0.525H\ 0.238L$ ($\lambda$=500 nm)
(c) $(0.575H\ 0.425L)^{10}\ 0.575H\ 0.213L$ ($\lambda$=500 nm)
(d) $(0.65H\ 0.35L)^{10}\ 0.65H\ 0.175L$ ($\lambda$=500 nm)

From FIG. 2, in the case where a rate H/L of film thickness between the high refractive index layer H and the low refractive index layer L of (a) is 1.0, a reflection band itself does not exist in λ(=500 nm). In the case where a rate of film thickness between the high refractive index layer H and the low refractive index layer L of (b) is about 1.1, a small and thin reflection band is formed in λ. In the case where a rate of film thickness between the high refractive index layer H and the low refractive index layer L of (c) is about 1.35, a larger and thicker (wider) reflection band than that of (b) is formed with respect to λ. In the case where a rate of film thickness between the high refractive index layer H and the low refractive index layer L of (d) is about 1.86, a further larger and thicker reflection band than that of (c) is formed with respect to λ.

The minus filter according to the embodiment of the invention uses the thus formed reflection band. That is, the minus filter in the present invention can change a wavelength bandwidth to be stopped or reflected by properly selecting a rate between the high refractive index layer H and the low refractive index layer L. The reflection band generated by shifting the rate of optical thickness between the high refractive index layer and the low refractive index layer is known as a "noise band" in the conventional optical multilayer filter such as a red infrared-ray cut filter. There is no proposal that this band is actively utilized as a reflection band, and in particular, is used as a minus filter. Therefore, the configuration according to the embodiment of the invention is inventive over that of the conventional minus filter.

Figure 3:
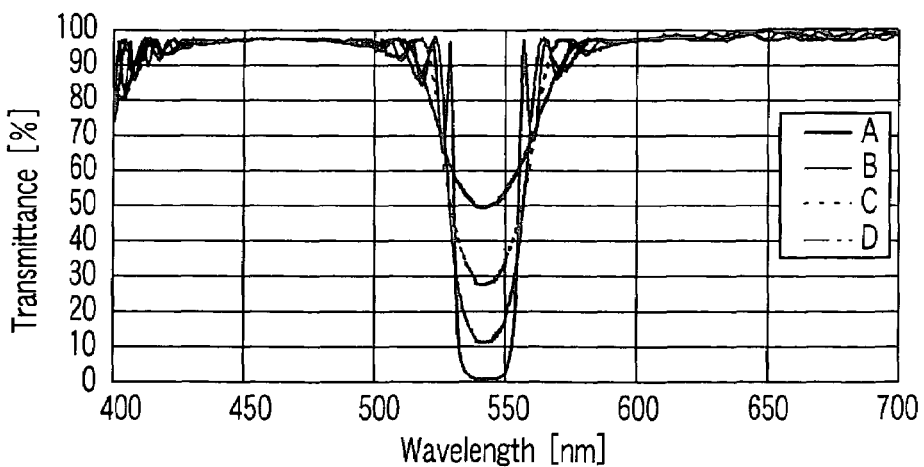
FIG. 3 is a view showing a spectral transmittance characteristic of a change in light stopping ratio or reflection index by a repetition count of a repetition layer.

In the reflection band for use in the minus filter according to the embodiment of the invention, a light stopping ratio or reflectivity can be changed by changing the repetition count of the repetition layer having the similar film thickness rate even in the case where a rate between the high refractive index and the low refractive index is constant. Table 1 shows how the light stopping ratio or reflectivity is changed depending on its repetition count in the case where the rate of film thickness between the high refractive index layer H and the low refractive index layer L is about 1.2. FIG. 3 shows a spectral transmittance characteristic at this time.

From FIG. 3, it is found that, in the minus filter according to the invention, a required stopping ratio (reflectivity) can be selected in accordance with the repetition count of the repetition layer having the same film thickness rate.

TABLE 1

Repetition count and stopping ratio (reflectivity) *λ = 543 nm

| | Repetition count | Stopping ratio (Reflectivity) | Design |
|---|---|---|---|
| A | 25 | 99.4% | (0.55H 0.45L)$^{25}$ 0.55H 0.225L |
| B | 13 | 88.70% | (0.55H 0.45L)$^{13}$ 0.55H 0.225L |
| C | 9 | 72.30% | (0.55H 0.45L)$^{9}$ 0.55H 0.225L |
| D | 6 | 50.40% | (0.55H 0.45L)$^{6}$ 0.55H 0.225L |

In the repetition layer of the high refractive index layer H and the low refractive index layer L having the optical thickness, as is evident from FIG. 3, a ripple is generated both sides of the reflection band. This ripple causes a problem depending on usage of the minus filter. In order to suppress this ripple, it is possible to use a technique which is often utilized in a general optical multilayer filter, of forming a laminate portion called an adjustment layer, the laminated portion being different from a repetition layer, before and after the repetition layer. A ripple can be reduced as a larger number of laminates of the adjustment layer are set. Extremely speaking, even if a repetition layer portion having same optical thickness is not provided, a minus filter having a small ripple and an equal reflection band width can be obtained as long as a sum of an average value of optical thicknesses of the high refractive index layer and an average value of the low refractive index layer in the repetition layer portion is in order of 1×λ, and as long as the rate of the optical thickness H of the high refractive index layer and the optical thickness L of the low refractive index layer in the repetition layer portion of the high refractive index layer and the low refractive index layer is equal.

Figure 4:
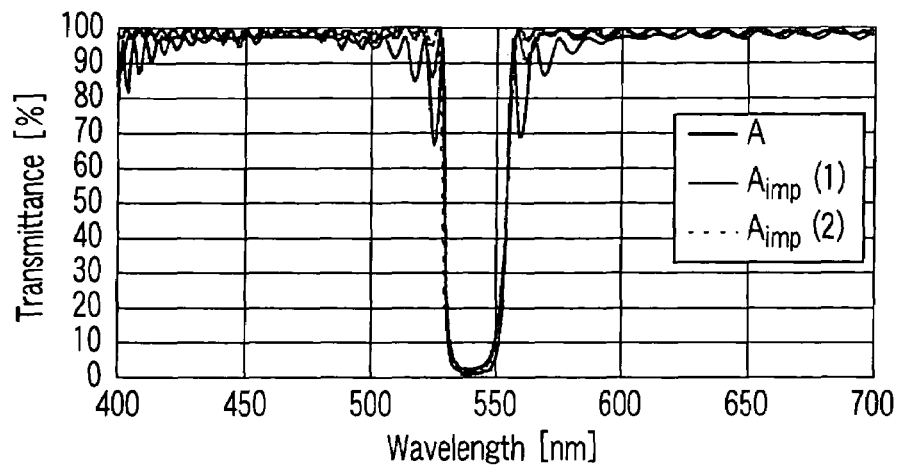
FIG. 4 is a view showing a spectral transmittance characteristic in the case where a ripple has been controlled.

FIG. 4 shows a spectral transmittance characteristic relating to a case where an adjustment layer is provided with respect to design (A) in Table 1 to suppress a ripple ($A_{imp(1)}$); and a case where a sum of an average of the optical thickness of the high refractive index layer and an average of the optical thickness of the low refractive index layer in the repetition layer portion of the high refractive index layer and the low refractive index layer is in order of 1×λ without providing the repetition layer portion, and the rate of the optical thickness H of the high refractive index layer and the optical thickness L of the low refractive index layer in the repetition layer portion of the high refractive index layer and the low refractive index layer is equal (in order of 1.2) ($A_{imp(2)}$). In the figure, these film designs are as follows.

A: (0.55H 0.45L)$^{25}$ 0.55H 0.225L $A_{imp(1)}$: 0.508H 0.4716L 0.524H 0.485L 0.527H 0.481L 0.531H 0.474L (0.55H 0.45L)$^{18}$ 0.537H 0.468L 0.517H 0.467L 0.505H 0.46L 0.483H 0.229L $A_{imp(2)}$: 0.493H 0.471L 0.518H 0.484L 0.528H 0.477L 0.535H 0.472L 0.537H 0.464L 0.541H 0.458L 0.539H 0.453L 0.545H 0.451L 0.546H 0.45L 0.553H 0.448L 0.552H 0.446L 0.556H 0.444L 0.552H 0.444L 0.556H 0.444L 0.554H 0.445L 0.557H 0.445L 0.554H 0.446L 0.553H 0.447L 0.548H 0.45L 0.547H 0.454L 0.545H 0.458L 0.544H 0.461L 0.538H 0.465L 0.5274H 0.464L 0.508H 0.454L 0.472H 0.224L All of these filters each have a 52-layered laminate structure, and λ is 543 nm. From FIG. 4, it is evident that a ripple can be reduced in accordance with the above-described method. In the parenthesis (the repetition layer portion in the same film thickness) in design A and $A_{imp(1)}$, a sum of averages of the optical thicknesses of the high refractive index layer and the low refractive index layer is 1×λ, and a ratio of the optical thickness between the high refractive index layer and the low refractive index layer is 1.22. In addition, an average of the film thickness of the high refractive index layer in $A_{imp(2)}$ is 0.538×λ, and an average of the film thickness of the low refractive index layer excluding a final layer is 0.456×λ. Therefore, a sum of these averages is 0.994×λ, and the ratio (H/L) is about 1.18.

While FIGS. 2 to 4 have illustrate a case where the optical thickness of the high refractive index layer is larger than the optical thickness of the low refractive index layer, a similar minus filter can be obtained also in the case where the optical thickness of the low refractive index layer is larger than the optical thickness of the high refractive index layer.

Figure 5:
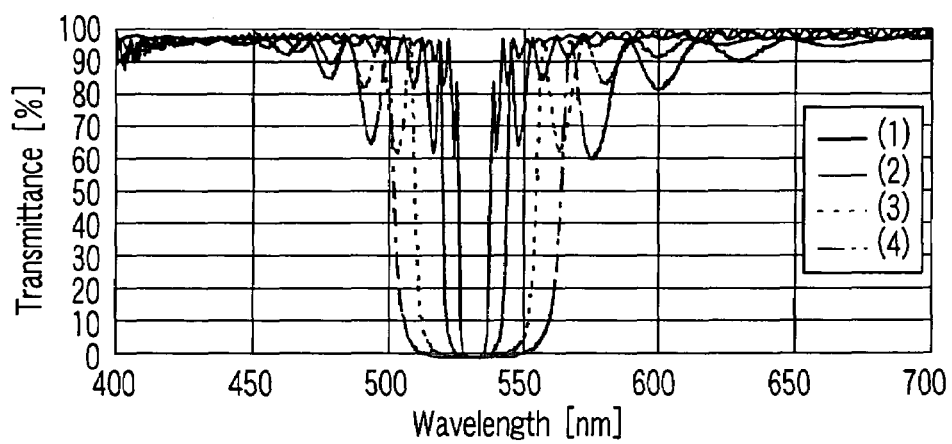
FIG. 5 is a view showing a spectral transmittance characteristic in the case where a design has been made while changing a ratio between optical thickness of a low refractive index layer and optical thickness of a high refractive index layer such that an stopping ratio (reflection index) exceeds 99%.
Figure 6:
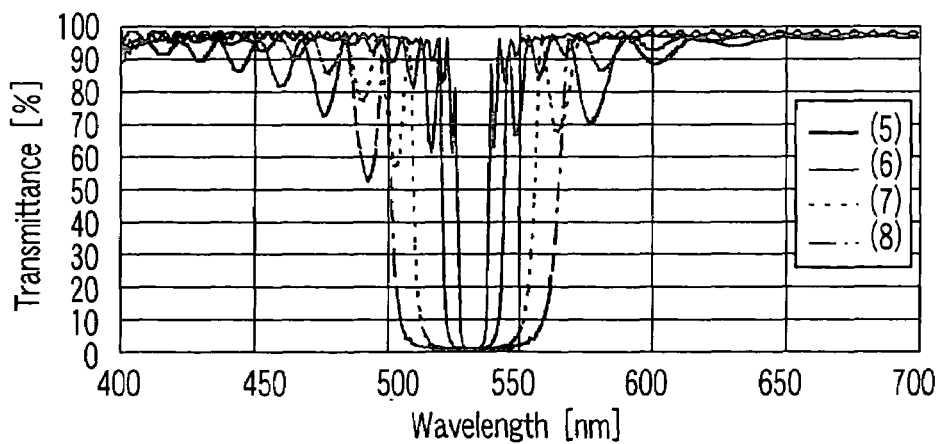
FIG. 6 is a view showing a spectral transmittance characteristic in the case where a design has been made while changing a ratio between optical thickness of a low refractive index layer and optical thickness of a high refractive index layer such that an stopping ratio (reflection index) exceeds 99%.

FIGS. 5 and 6 each show an example in which a design is made while changing a rate such that an stopping ratio (reflection index) exceeds 99% with respect to a case where the optical thickness of the high refractive index layer is larger than the optical thickness of the low refractive index layer (in the case where H/L>1); and a case where the optical thickness of the low refractive index layer is larger than the optical thickness of the high refractive index layer (in the case where H/L<1). FIG. 5 shows the case where H/L>1, and FIG. 6 shows the case where H/L<1. In these figures, the film designs are as follows.

(1) (0.525H 0.475L)$^{56}$ 0.525H 0.238L (λ=532 nm)
(2) (0.55H 0.45L)$^{27}$ 0.55H 0.225L (λ=532 nm)
(3) (0.6H 0.4L)$^{14}$ 0.6H 0.2L (λ=532 nm)

(4) $(0.65H\ 0.35L)^{10}\ 0.65H\ 0.175L$ ($\lambda$=532 nm)
(5) $(0.475H\ 0.525L)^{56}\ 0.475H\ 0.2625L$ ($\lambda$=532 nm)
(6) $(0.45H\ 0.55L)^{27}\ 0.45H\ 0.275L$ ($\lambda$=532 nm)
(7) $(0.4H\ 0.6L)^{14}\ 0.4H\ 0.3L$ ($\lambda$=532 nm)
(8) $(0.35H\ 0.65L)^{10}\ 0.35H\ 0.325L$ ($\lambda$=532 nm)

The above example shows that H/L ranges from 1.1 to 1.86 and ranges from 0.53 to 0.9. However, in the case where H/L is close to 1.0 as well, it falls into the scope of the present invention in the case where a reflection band is formed there, and the band is actively used as a minus filter. Also in the case where H/L is larger than 1.86 or smaller than 0.53, it falls into the scope of the present invention in the case where a reflection band to be formed is actively used as a minus filter. In the case where H/L is equal to or larger than 2 or is smaller than 0.5, however, it cannot be said that the width in the wavelength direction of the reflection band is narrow as compared with that of the conventional minus filter. Because the width in the wavelength direction of the reflection band does not fluctuate significantly, it is impossible to sufficiently achieve a characteristic that the width in the wavelength direction can be selected in accordance with the rate of the optical thickness between the high reflection index layer and the low reflection index layer. Therefore, the effectiveness of the present invention is sufficiently achieved in the case where H/L is larger than 0.5 and is smaller than 2.

Further, in the range such that H/L is between 0.6 and 1.6, the width in the wavelength direction of the reflection band becomes equal to or smaller than 50 nm in a visible region, and the width in the wavelength direction of the reflection band which is hardly provided in any other technique can be achieved. Thus, the present invention is effective in particular. In this case, in the case where H/L>1, the invention includes a repetition layer formed such that the average optical thickness of the high refractive index layer is $0.51\lambda_0$ to $0.62\lambda_0$; and the average optical thickness of the low refractive index layer is $0.38\lambda_0$ to $0.49\lambda_0$. In the case where L/H>1, the present includes a repetition layer formed such that the average optical thickness of the high refractive index layer is $0.39\lambda_0$ to $0.48\lambda_0$; and the average optical thickness of the low refractive index layer is $0.52\lambda_0$ to $0.62\lambda_0$.

Figure 7:
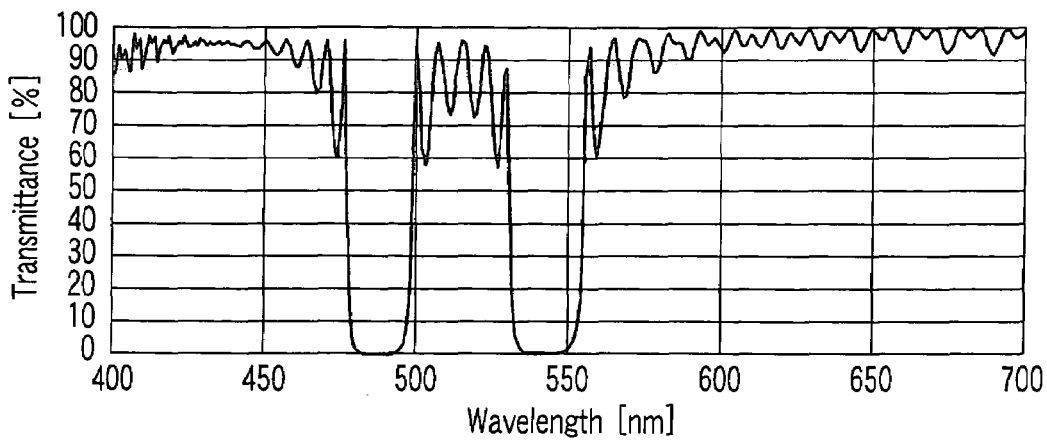
FIG. 7 is a view showing a spectral transmittance characteristic in the case where a plurality of reflection bands are provided.

The minus filter according to the embodiment of the invention can have a plurality of reflection bands. FIG. 7 shows an example of the filter. The film designs of the minus filter having the characteristic as shown in FIG. 7 are as follows:

$(0.55H\ 0.45L)^{27}\ 0.55H\ 0.476L\ (0.619H\ 0.501L)^{27}\ 0.619H\ 0.251L$ (when $\lambda$=488 nm)

The above film design can be expressed as follows by changing the designed center wavelength ($\lambda$):

$(0.489H\ 0.404L)^{27}\ 0.489H\ 0.427L\ (0.55H\ 0.45L)^{27}\ 0.55H\ 0.225L$ (when $\lambda$=543 nm)

Here, although two types of expression have been introduced, these two types of expression describe the optical thickness with respect to each center wavelength $\lambda$ of two reflection bands, and are design values of the same filter. From the first expression $(0.55H\ 0.45L)^{27}\ 0.55$ of the above two types of expression, a sum of an average value of the optical thickness of a high refractive index layer and an average value of the optical thickness of a low refractive index layer is obtained as $\lambda$ (488 nm) at a repetition layer portion at the substrate side in the minus filter design of FIG. 7, and a rate of the optical thickness between the high refractive index layer and the low refractive index layer is 1.22. In addition, from the second expression $(0.55H\ 0.45L)^{27}\ 0.55$, a sum of an average value of the optical thickness of a high refractive index layer and an average value of the optical thickness between the of a low refractive index layer is obtained as $\lambda$ (543 nm) at a repetition layer portion at the air side in the minus filter design value of FIG. 7, and a rate of the optical thickness between the high refractive index layer and the low refractive index layer is 1.22.

Although the minus filter having a plurality of reflection bands in FIG. 7 includes ripples at the right and left of the reflection band, these ripples can be reduced in accordance with a method of suppressing the ripples by providing the adjustment layer described previously. An example of suppressing these ripples will be described in examples described later.

The above embodiment has shown the minus filter compatible with the light incident vertical to the filter. In, the minus filter according to the embodiment of the invention is very effective to the obliquely incident light. This is because, by using the minus filter for the obliquely incident light, it is possible to take out the light having a narrow wavelength region in an intended direction as well as to merely stop (cut) the light.

In the case where the minus filter is utilized for the obliquely incident light, its optical characteristic is shifted to the short wavelength side, as is well known as a characteristic of an interference filter. That is, the minus filter according to the embodiment of the invention compatible with the obliquely incident light utilizes a reflection band compatible with the obliquely incident light formed when the reflection band appearing as $\lambda_0$ with respect to the vertically incident light is shifted more significantly to the short wavelength side.

Figure 8:
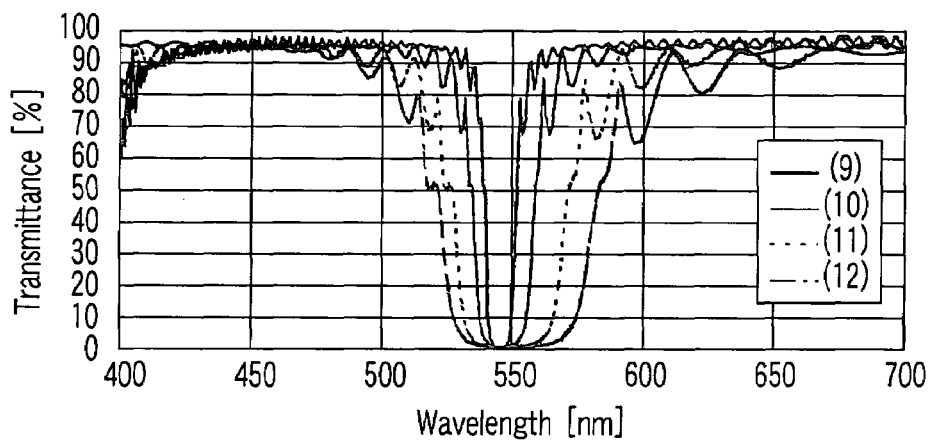
FIG. 8 is a view showing a spectral transmittance characteristic in the case where a design has been made while changing a ratio between optical thickness of a low refractive index layer and optical thickness of a high refractive index layer such that an stopping ratio (reflection index) exceeds 99%.
Figure 9:
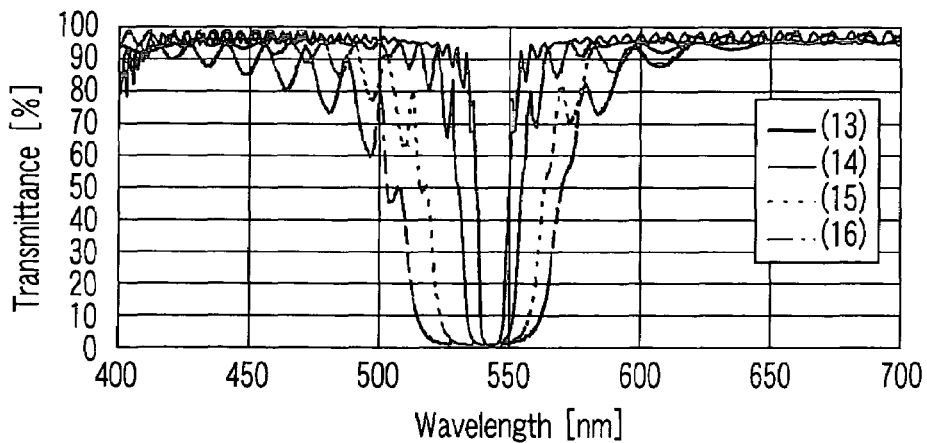
FIG. 9 is a view showing a spectral transmittance characteristic in the case where a design has been made while changing a ratio between optical thickness of a low refractive index layer and optical thickness of a high refractive index layer such that an stopping ratio (reflection index) exceeds 99%.

In the case where the minus filter is utilized for the obliquely incident light, an obliquely incident angle of 45° is best utilized mainly because an optical system is easily laid out. FIGS. 8 and 9 each show an example in which a design is made while changing a rate such that an stopping ratio (reflection index) exceeds 99% in a case where the optical thickness of the high refractive index layer is larger than the optical thickness of the low refractive index layer (in the case where H/L>1); and in a case where the optical thickness of the low refractive index layer is larger than the optical thickness of the high refractive index layer (in the case where L/H>1) with respect to a layout in which a light is incident to the minus filter at an incidence angle of 45°. FIG. 8 shows the case where H/L>1, and FIG. 9 shows the case where L/H>1. Here, the film design values in each of the cases are as follows:

(9) $(0.504H\ 0.496L)^{56}\ 0.504H\ 0.248L$
(10) $(0.529H\ 0.471L)^{27}\ 0.529H\ 0.236L$
(11) $(0.579H\ 0.421L)^{14}\ 0.579H\ 0.211L$
(12) $(0.629H\ 0.371L)^{10}\ 0.629H\ 0.186L$
(13) $(0.454H\ 0.546L)^{56}\ 0.454H\ 0.273L$
(14) $(0.429H\ 0.5711))^{27\ 0.429}H\ 0.286L$
(15) $(0.379H\ 0.621L)^{14}\ 0.379H\ 0.311L$
(16) $(0.329H\ 0.671H)^{10}\ 0.329H\ 0.336L$

In the case where the light incidence angle is 45°, the reflection band is eliminated in the case where H/L is in order of 0.92, not when the rate H/L of the film thickness between the high refractive index layer and the low refractive index layer is 1. That is, the reflection band used in the minus filter in the embodiment of the invention can be obtained by shifting H/L from 0.92. Thus, in the case where the light incidence angle is 45°, the optical thickness of each of the high refractive index layer and the low refractive index layer effective to obtain the minus filter changes as compared with a case where the light incidence is vertically made. In the case where the light incidence angle is 45°, the film thickness range suitable to obtain the minus filter according to the embodiment of the invention is as follows. That is, in the case where H/L>0.92, the average optical thickness of the high refractive index layer is from $0.49\lambda_0$ to $0.63\lambda_0$ and the average optical thickness of the low refractive index layer is from $0.37\lambda_0$ to $0.51\lambda_0$. In the case where H/L<0.92, the average optical thickness of the high refractive index layer is from $0.32\lambda_0$ to $0.47\lambda_0$ and the average optical thickness of the low refractive index layer is from $0.53\lambda_0$ to $0.68\lambda_0$. However, the minus filter in the embodiment of the invention is not limited to this film thickness range, and includes a case where H/L is more proximal to 0.92 or is more distant from 0.92 in the same manner as that shown with respect to a case of vertical incidence.

The minus filter for an obliquely incidence light in the embodiment of the invention has a great advantage that a difference in reflection bandwidth caused by a polarizing component (P, S) of an incident light is small except the fact that a narrow reflection band can be achieved. Because the reflection band and a transmission band can be made proximal to each other due to this advantage that the difference in reflection band caused by the polarizing component (P, S) of the incident light is small, the minus filter according to the embodiment of the invention is suitable as a minus filter compatible with the obliquely incident light.

In the above description, even if the difference in refraction bandwidth is small, the reflection index of the reflection band with respect to the S polarizing light can be increased as compared with the P polarizing light. Thus, the minus filter according to the embodiment of the invention can achieve high performance by causing light to be incident by S polarization in particular while a laser capable of selecting the light polarizing direction is used as a light source. Of course, in the case where the laser is used as a light source, an advantage of a narrow reflection bandwidth which is hardly achieved by any other filter, the advantage being achieved by the minus filter according to the embodiment of the invention, becomes useful.

The minus filter for the obliquely incident light in the embodiment of the invention described above can provide a plurality of reflection bands, as described with respect to the case of vertical incidence. An example of this filter will be described later.

The above description has shown important points on the film configuration of the minus filter in the embodiment of the invention. However, in order to achieve the minus filter in the embodiment of the invention, technical breakthrough as well as these important points is required.

As described previously, the reflection band used in the minus filter in the embodiment of the invention has been disliked as a "noise band" so far. This is because, as long as the manufacturing precision of a multi-layered film is extremely high, the rate between the high refractive index layer and the low refractive index layer cannot be set as an intended value, and, as a result, the size of the reflection band cannot be controlled. The Inventor found out that, as a result of utmost research, the low manufacturing precision of the multilayer filter which has become a problem can be solved by a dielectric multi-layered filter employing an ion process, the filter being capable of stabilizing the film refractive index and suppressing an optical characteristic change of the filter caused by the environment. The ion process used here designates a manufacturing technique such as sputtering, ion plating, and IAD. These multilayer filters obtained in accordance with these manufacturing techniques called ion process are obtained as shiftless filters featured in that a characteristic change due to an ambient environment is reduced. The term "shiftless" used here denotes that a small deviation of an optical characteristic of a filter occurs due to a change of the general ambient environment, and that a deviation in position of the reflection zone is in order of ±1 nm or less in the minus filter according to the embodiment of the invention. In addition, the Inventor has found out that in the above-described ion process, a film material suitable to configure the multilayer minus filter such that the film refractive index and absorption can be stabilized is limited to a certain degree. The film material particularly suitable to configure the above-described multilayer minus filter is a high refractive film material made of $Ta_2O_5$, $TiO_2$, $Nb_2O_5$ or a mixture including them and a low refractive index film material made of $SiO_2$ or a mixture including it. Further, in the case where a high transmittance is required in an ultraviolet region of 350 mm or less, $HfO_2$, $Ai2O_3$ or a mixture including them can be used to be substituted for the high refractive index material having absorption in the ultraviolet region of 350 nm or less.

Because the shiftless minus filter manufactured in accordance with the ion process is high in density inside a film, a high film stress occurs depending on a substrate material to be used, and a deformation which cannot be ignored depending on usage is brought into a substrate. The Inventor has found out that, as a result of utmost research, it is effective to use a substrate having a low linear expansion coefficient in order to reduce this deformation. Specifically, the deformation quantity can be placed in a practically problem free range in a glass having a linear expansion coefficient of $0.8 \times 10^{-6}$ or less. Even in a glass having a linear expansion coefficient of $0.8 \times 10^{-6}$ or less, a quartz glass is useful in particular because it can be easily obtained. The substrate deformation often causes no problem in the case where the substrate is used for a vertically incident light, and often causes a problem in a multilayer filter used for an obliquely incident light.

As has been described above, according to the minus filter in the embodiment of the invention, a narrow reflection bandwidth which cannot be achieved by the conventional minus filter can be achieved. In addition, its reflection bandwidth is selective, and the reflection bandwidth can be arbitrarily set. Such characteristics of the minus filter according to the embodiment of the invention can satisfy "a need for observing plural kinds of fluorescence at the same time and precisely observing the interaction in cells or the layouts of a plurality of observation objects by using lights having a plurality of wavelengths for excitation of a fluorescence substrate" in the field of molecule biology using the fluorescence microscope described in the prior art or "a need for using a light (operating light) for operating a cell apart from the light used for excitation or observation of a fluorescence substrate or stimulating the cell to use a light (stimulating light) for observing its reaction in order to observe a dynamic behavior of a living cell". That is, the fluorescence microscope using the minus filter in the invention opens up a new possibility of the fluorescence microscope.

In addition, the fluorescence microscope using the minus filter in the embodiment of the invention can achieve its characteristic fully and can provide higher application in observation in which a laser is used as a light source due to its narrow reflection bandwidth.

Hereinafter, specific design examples will be described.

FIRST EXAMPLE (Configuration)

There is provided a multilayer minus filter using $Ta_2O_5$ as a high refractive index material and $SiO_2$ as a low refractive index material, the filter being used for a light incident at 45° and having the following film configuration. Here, a reference wavelength is defined as 437.5 nm which is a center wavelength of a reflection band with respect to a light incident at 0°. 0.527H 0.53L 0.534H 0.501L 0.513H 0.484L 0.522H 0.478L 0.523H 0.473L 0.53H 0.467L 0.532H 0.467L 0.537H 0.462L 0.538H 0.463L 0.54H 0.459L 0.54H 0.461L 0.541H 0.459L 0.541H 0.46L 0.542H 0.459L 0.542H 0.46L 0.542H
0.46L 0.541H 0.461L 0.54H 0.463L 0.538H 0.464L 0.536H
0.467L 0.534H 0.469L 0.531H 0.473L 0.528H 0.476L
0.523H 0.482L 0.518H 0.488L 0.511H 0.496L 0.502H
0.504L 0.504H 0.52L 0.508H 0.523L 0.501H 0.260L In the above-described film configuration having all 60 layers, an average of optical thickness of the high refractive index layer in the 5th to 50th layers from the substrate is 0.534×λ; and an average of optical thickness of the low refractive index layer is 0.468. A sum of the average of the optical thickness of the high refractive index layer and the average of the optical thickness of the low refractive index layer is 1.002, and a rate H/L thereof is 1.141.

A back face of the multilayer minus filter is non-coated, and a double-sided, polished parallel flat composite quartz glass having 26 mm×38 mm×2 mmt has been used for the substrate.

Figure 10:
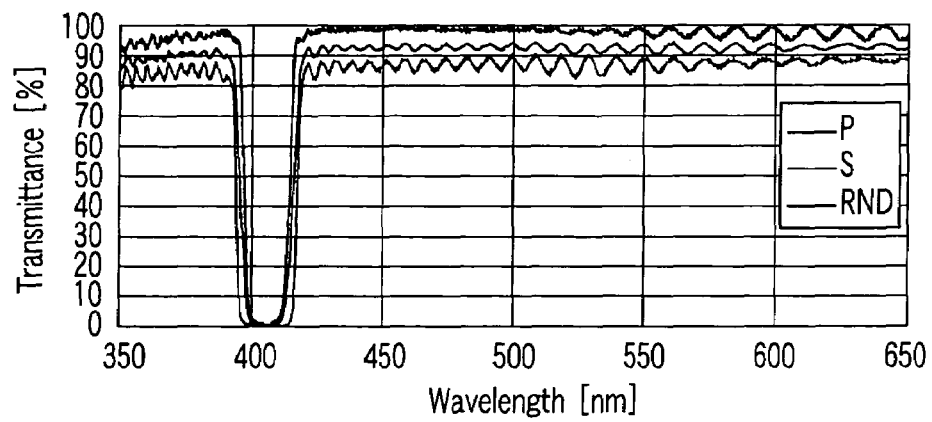
FIG. 10 is a view showing an actual spectral transmittance of a multilayer minus filter in a first example.

(Function) FIG. 10 shows an actual spectral transmittance of the multilayer minus filter in this example. Although not explicitly shown, the reflection band having a peak in 437.5 nm is formed for the vertically incident light.

When producing the multilayer minus filter in this example, ion assisted deposition (IAD) has been used, and a substrate heating temperature (set value) in deposition has been 300° C.

After film forming, a substrate has been deformed so as to be protruded on the side of a face on which a filter is formed. As a result of the measurement using an interfermeter, its deformation quantity has been 4 to 5 in Newton number (NR=4 to 5), and its deformation quantity has been within the range which practically causes no problem.

In this example, although Ta$_2$O$_5$ has been used as a high refractive index material, the similar optical characteristic is obtained and the following advantageous effect can be achieved as long as a film material capable of achieving the similar manufacturing precision is used. In addition, although SiO$_2$ has been used for a low refractive index material, the similar optical characteristic is obtained, and the following advantageous effect can be achieved as long as a film material having the similar refractive index and capable of the similar manufacturing precision is used. Thus, the material used in this example is not an element which limits advantageous effect of this example. This also applies to the subsequent examples.

In addition, although this example shows a minus filter for reflecting a light which is incident by 45°, the light having a wavelength proximal to 405 nm, a minus filter for reflecting only another wavelength can be produced in accordance with the similar film configuration in which the designed center wavelength has been shifted. That is, the reflection wavelength can be arbitrarily selected in accordance with the same film configuration, and thus, the reflection wavelength of this example is not an element which limits advantageous effect of this example. This also applies to the subsequent examples.

In addition, even if there is an element employed in this example, the element being capable of obtaining the same advantageous effect by providing a constituent element having the similar optical and mechanical properties, such an element is not an element which limits advantageous effect of this example. This also applies to the subsequent examples.

(Advantageous Effect)

A minus filter of this example having a reflection band in 405 nm with respect to a 45° incident light reflects only a light proximal to 405 nm, and transmits a light having another wavelength. This filter can be used for a mirror for allowing a light (stimulating light=405 nm LD laser) for stimulating a cell and observing its reaction to enter an observation system, the light being used apart from a light used for excitation or observation of a fluorescence substance when a dynamic behavior of a living cell is observed in a confocal laser microscope utilizing a laser light as a light source.

The minus filter of this example is about 20 nm in width of reflection band, and achieves a very narrow reflection band which cannot be achieved by any other filter. Thus, this filter can be utilized, of course, in the case where a fluorescence body which emits fluorescence to 415 nm or more is observed in the confocal laser microscopy, and in the case where a fluorescence body which emits fluorescence in 395 nm or less is observed in the confocal laser microscopy (such as observation in which 351 nm UV Argon laser beam is used as a light source or observation using 2-photom excitation in which a laser beam having a long wavelength is used as a light source). This minus filter can be utilized in the case where an attempt is made to transmit another wavelength by reflecting only a light having a wavelength proximal to 405 nm, and is highly applicable.

SECOND EXAMPLE (Configuration) There is a multilayer minus filter using Ta$_2$O$_5$ as a high refractive index material and SiO$_2$ as a low refractive index material, the minus filter being used for a vertically incident light and having the following film configuration. Here, a reference wavelength is 633 nm which is a center wavelength of a reflection band with respect to a light incident at 0°. 0.516H 0.508L 0.546H 0.507L 0.543H 0.478L
0.514H 0.464L 0.527H 0.474L 0.534H 0.464L 0.531H
0.464L 0.539H 0.463L 0.539H 0.458L 0.539H 0.458L
0.544H 0.457L 0.543H 0.453L 0.545H 0.454L 0.548H
0.453L 0.546H 0.45L 0.549H 0.452L 0.549H 0.449L 0.548H
0.45L 0.551H 0.45L 0.55H 0.448L 0.55H 0.45L 0.551H
0.448L 0.55H 0.448L 0.551H 0.449L 0.551H 0.448L 0.55H
0.449L 0.551H 0.449L 0.55H 0.449L 0.549H 0.45L 0.55H
0.451L 0.548H 0.45L 0.548H 0.453L 0.548H 0.452L 0.545H
0.453L 0.546H 0.456L 0.543H 0.454L 0.541H 0.459L
0.542H 0.46L 0.536H 0.461L 0.537H 0.468L 0.535H 0.467L
0.528H 0.469L 0.526H 0.474L 0.526H 0.472L 0.512H
0.453L 0.471H 0.229L In the above-described film configuration of all 92 layers, an average of optical thickness of the high refractive index layer in the 15th to 76th layer from the substrate is 0.547×λ, and an average of optical thickness of the low refractive index layer is 0.452. A sum of the average of the optical thickness of the high refractive index layer and the average of the optical thickness of the low refractive index layer is 0.999, and a ratio H/L thereof is 1.209.

A back face of the multilayer minus filter is non-coated, and a double-sided, polished parallel flat white plate glass having φ25×2.5 mmt has been used for the substrate.

(Function)

Figure 11:
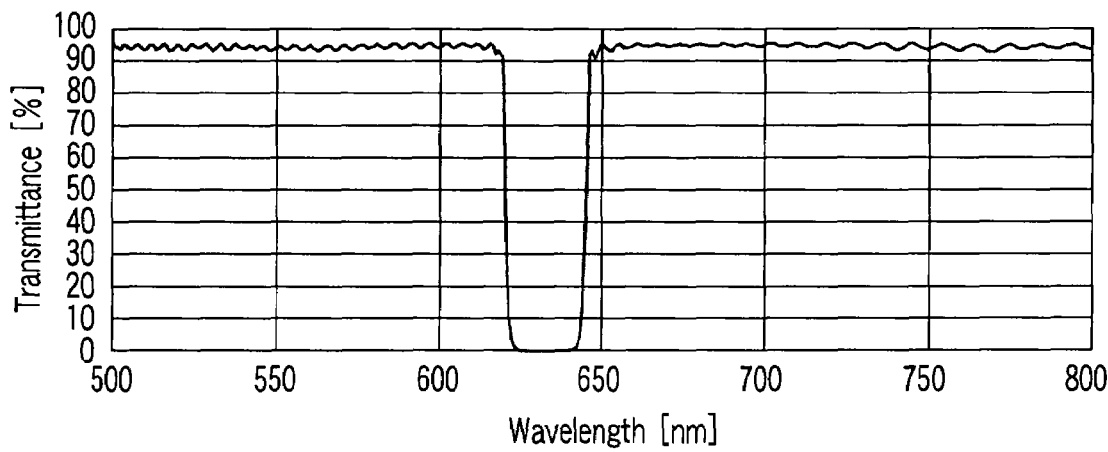
FIG. 11 is a view showing an actual spectral transmittance of a multilayer minus filter in a second example.

FIG. 11 shows an actual spectral transmittance of the multi-layered filter in this example. A peak of the reflection band with respect to the vertically incident light which appears here appears at 633 nm.

When the multilayer minus filter in this example is produced, the substrate heating temperature (set value) in deposition has been 250° C. by using substrate RF applied ion plating.

The substrate after film formed has been deformed (NR10 or more) to an extent such that an NR value cannot be read by measurement using an interfermeter so as to be protruded on the side of a face on which the filter has been formed.

Although the minus filter of this example is formed on one face of a parallel flat white plate glass, a minus filter obtained by shifting only a designed reference wavelength λ is formed on a non-coated face of the parallel flat white plate glass, thereby making it possible to configure a 2-wavelength cut filter for stopping two wavelengths. Additionally, a minus filter having the same configuration as that of this example, the filter being obtained by shifting only the designed reference wavelength λ, is formed on a parallel flat glass in plurality, and these filters are superimposed, thereby making it possible to produce a multi-band stopping (=multi-band transmission) filter for cutting a variety of wavelengths. In this manner, there can be provided an optical element capable of transmitting the stopping wavelength while stopping a plurality of wavelengths.

Further, although the minus filter of this example shows a case where the ratio H/L between the average of the optical thickness of the high refractive index layer and the average of the optical thickness of the low refractive index layer is 1.209, a design is made while changing this ratio, thereby making it possible to arbitrarily select a width of this element band. The minus filter according to the embodiment of the invention in which the ratio is thus changed is superimposed in plurality, thereby making it possible to configure a multi-band stopping (=multi-band transmission) filter having a plurality of widths of various stopping bandwidths.

Moreover, in the minus filter of this example, an stopping ratio having a reflection index of 99.9% or more in 633±4 nm has been achieved by all 92-layered configuration. However, the stopping ratio can be reduced by reducing the number of layers or the stopping ratio can be increased by increasing the number of layers. In addition, in the case where a sufficient stopping ratio cannot be obtained by one filter, the same minus filter is superimposed in plurality, thereby making it possible to increase the stopping ratio at the same wavelength. These facts also apply to the subsequent examples, and advantageous effects of the respective examples are not limited.

(Advantage)

The minus filter of this example having an stopping band (reflection index of 99.9% or more in 633±4 nm and half-value width of about 25 nm of stopping band) proximal to 633 nm with respect to a vertically incident light can transmit a light having a wavelength proximal to 633 nm. The minus filter of this example is effective in particular in stopping a 633 nm Red HeNe laser which is a laser corresponding to 63 nm.

In addition, the minus filter of this example provides an optical element which has been hardly achieved, the optical element being capable of transmitting the stopping wavelength while stopping a plurality of wavelengths by forming a minus filter having the same configuration as that of this example, the filter shifting only the above-described designed reference wavelength A, on the parallel flat glass in plurality.

THIRD EXAMPLE (Configuration)

There is provided a multilayer minus filter using $Ta_2O_5$ as a high refractive index material and $SiO_2$ as a low refractive index material, the filter being used for a vertically incident light and having the following film configuration. Here, a reference wavelength is 543 nm which is a center wavelength of a reflection band with respect to a light incident to 0°.

0.505H 0.526L 0.549H 0.531L 0.545H 0.516L 0.496H
0.456L 0.489H 0.499L 0.521H 0.481L 0.491H 0.486L 0.52H
0.496L 0.512H 0.485L 0.514H 0.49L 0.519H 0.487L 0.51H
0.483L 0.516H 0.486L 0.513H 0.481L 0.517H 0.484L
0.516H 0.48L 0.518H 0.482L 0.518H 0.48L 0.518H 0.479L
0.52H 0.48L 0.519H 0.477L 0.52H 0.48L 0.521H 0.477L
0.52H 0.478L 0.522H 0.477L 0.521H 0.477L 0.522H 0.478L
0.522H 0.477L 0.521H 0.478L 0.522H 0.477L 0.521H
0.478L 0.522H 0.477L 0.521H 0.477L 0.522H 0.478L
0.521H 0.477L 0.522H 0.478L 0.522H 0.477L 0.521H
0.478L 0.522H 0.478L 0.521H 0.478L 0.522H 0.479L 0.52H
0.477L 0.521H 0.48L 0.521H 0.478L 0.519H 0.48L 0.521H
0.48L 0.519H 0.48L 0.518H 0.482L 0.518H 0.481L 0.515H
0.483L 0.518H 0.482L 0.514H 0.484L 0.519H 0.486L
0.513H 0.482L 0.511H 0.489L 0.518H 0.489L 0.496H
0.468L 0.498H 0.499L 0.531H 0.512L 0.538H 0.503L
0.486H 0.45L 0.487H 0.503L 0.52H 0.472L 0.425H 0.217L

In the above-described film configuration of all 128 layers, an average of the optical thickness of the high refractive index layer in the 15th to 106th layer from the substrate is 0.519×λ, and an average of the optical thickness of the low refractive index layer is 0.480. A sum of the average of the optical thickness of the high refractive index layer and the average of the optical thickness of the low refractive index layer is 0.999, and a ratio H/L thereof is 1.081.

A back face of the multilayer minus filter is non-coated, and a double-sided, polished parallel flat BK7 optical glass having φ25×2.5 mmt has been used for the substrate material.

Figure 12:
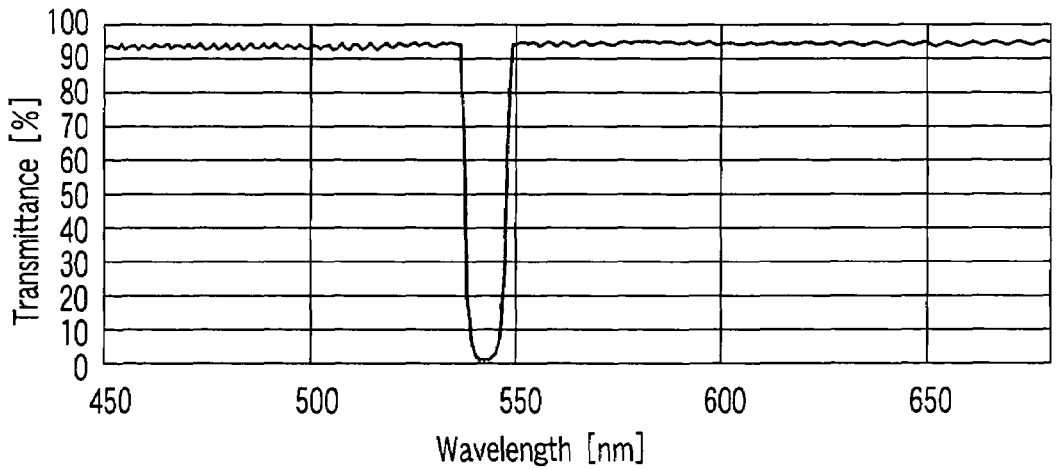
FIG. 12 is a view showing an actual spectral transmittance of a multilayer minus filter in a third example.

(Function) FIG. 12 shows an actual spectral transmittance of the multilayer minus filter in this example. A peak of the reflection band with respect to the vertically incident light appearing here appears at 543 nm.

When the multilayer minus filter in this example is produced, ion assisted deposition (IAD) has been used, and the substrate heating temperature (set value) in deposition has been 300° C.

The substrate after film formed has been deformed (NR10 or more) to an extent such that an NR value cannot be read by the measurement using an interfermeter so as to be protruded on the side of a face on which the filter has been formed.

(Advantage)

The minus filter of this example having an stopping band (in order of reflection index of 98% in 543 nm and half-value width of about 10 nm in stopping band) proximal to 543 nm with respect to a vertically incident light can transmit a light having another wavelength while stopping only a light which has a wavelength proximal to 543 nm. In addition, the minus filter of this example provides an optical element which has been hardly achieved, the optical element being capable of transmitting the stopping wavelength while stopping a plurality of wavelengths by forming a minus filter having the same configuration as that of this example, the filter shifting only the above-described designed reference wavelength λ, on the parallel flat glass in plurality.

FOURTH EXAMPLE (Configuration)

There is provided a multilayer minus filter using $Ta_2O_5$ as a high reflective index material and $SiO_2$ as a low refractive index material, the filter being used for a vertically incident light and having the following film configuration. Here, a reference wavelength has been indicated by two kinds of expression of 481 nm and 548 nm which become the center wavelengths of the reflection band with respect to the light incident at 0° C.

(Expression when λ=481 nm)

0.497H 0.509L 0.42H 0.521L 0.452H 0.547L 0.456H 0.574L
0.408H 0.59L 0.425H 0.589L 0.418H 0.577L 0.393H
0.594L 0.407H 0.62L 0.392H 0.61L 0.384H 0.594L 0.41H
0.604L 0.391H 0.612L 0.387H 0.6L 0.411H 0.6L 0.395H
0.608L 0.405H 0.584L 0.432H 0.549L 0.433H 0.57L 0.425H 0.597L 0.503H 0.613L 0.579H 0.617L 0.549H
0.615L 0.551H 0.608L 0.509H 0.618L 0.501H 0.613L
0.52H 0.632L 0.538H 0.618L 0.542H 0.637L 0.491H
0.618L 0.483H 0.637L 0.53H 0.624L 0.535H 0.636L
0.509H 0.627L 0.499H 0.632L 0.507H 0.634L 0.517H
0.625L 0.518H 0.635L 0.519H 0.627L 0.508H 0.631L
0.502H 0.628L 0.522H 0.629L 0.524H 0.626L 0.513H
0.621L 0.519H 0.627L 0.526H 0.62L 0.517H 0.614L
0.521H 0.616L 0.545H 0.616L 0.545H 0.608L 0.517H
0.594L 0.525H 0.608L 0.576H 0.594L 0.57H 0.621L
0.564H 0.302L (Expression when λ=58 nm)
0.43H 0.446L 0.364H 0.457L 0.391H 0.479L 0.395H 0.503L
0.353H 0.517L 0.368H 0.516L 0.362H 0.506L 0.34H
0.52L 0.352H 0.544L 0.339H 0.535L 0.333H 0.521L
0.355H 0.529L 0.339H 0.537L 0.335H 0.526L 0.356H
0.525L 0.341H 0.533L 0.351H 0.512L 0.373H 0.481L
0.374H 0.5L 0.368H 0.523L 0.435H 0.537L 0.501H
0.541L 0.475H 0.539L 0.477H 0.533L 0.44H 0.542L
0.433H 0.537L 0.45H 0.554L 0.466H 0.542L 0.469H
0.558L 0.425H 0.541L 0.418H 0.558L 0.459H 0.547L
0.463H 0.558L 0.44H 0.549L 0.432H 0.554L 0.439H
0.556L 0.448H 0.548L 0.448H 0.556L 0.449H 0.55L
0.439H 0.553L 0.434H 0.551L 0.452H 0.552L 0.453H
0.549L 0.444H 0.544L 0.449H 0.549L 0.445H 0.543L
0.448H 0.538L 0.451H 0.54L 0.472H 0.54L 0.471H
0.533L 0.447H 0.521L 0.455H 0.533L 0.498H 0.521L
0.493H 0.544L 0.488H 0.265L In the above-described fully 110 layered film configuration, the 7th to 38th layers from a substrate form a reflection band in 481 nm. An average of the optical thickness of the high reflection index layer when λ=481 nm in the 7th to 38th layer from the substrate is 0.409×λ and an average of the optical thickness of the low reflective index layer is 0.592. (A sum of the average of the optical thickness of the high refractive index layer and the average of the optical thickness of the low refractive index layer is 1.001, and a ratio H/L thereof is 0.691.) In addition, in the above-described fully 110-layered configuration, the 53rd to 100th layers from the substrate form a reflection band in 548 nm. An average of the optical thickness of the high refractive index layer when λ=548 nm in the 53rd to 100th layers from the substrate is 0.449×λ, and an average of the optical thickness of the low refractive index layer is 0.548. A sum of the average of the optical thickness of the high refractive index layer and the average of the optical thickness of the low refractive index layer is 0.997, and a ratio thereof is 0.819.

A back face of the multilayer minus filter is non-coated, and a double-sided, polished parallel flat composite quartz glass of φ15×2 mmt has been used for the substrate.

Figure 13:
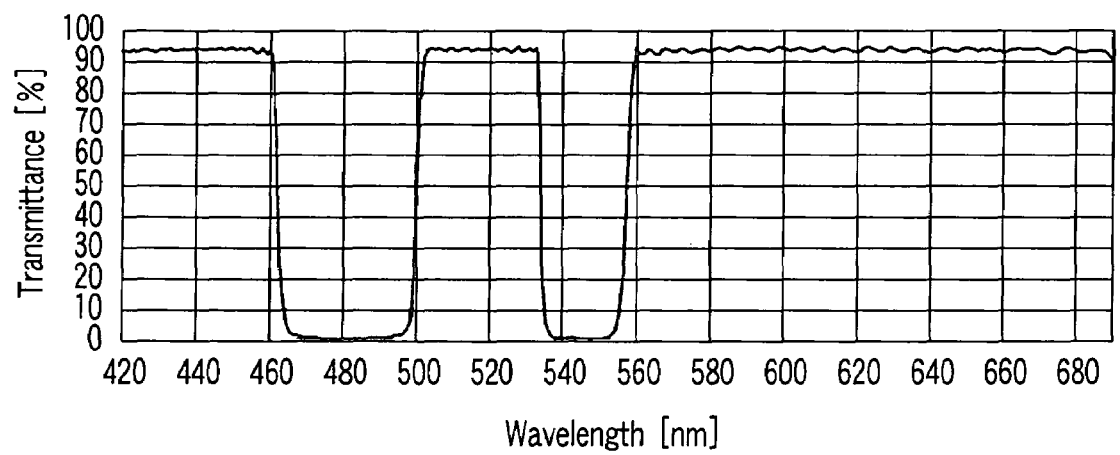
FIG. 13 is a view showing an actual spectral transmittance of a multilayer minus filter in a fourth example.

(Function)
FIG. 13 shows an actual spectral transmittance of the multilayer minus filter in this example. A peak of the reflection band with respect to the vertically incident light appearing here appears at 481 nm and 548 nm.

When the multilayer minus filter in this example is produced, ion assisted deposition (IAD) has been used, and the substrate heating temperature (set value) in deposition has been 300° C.

The substrate after film formed has been deformed in order of NR=1 by the measurement using an interfermeter so as to be protruded on the side of a face on which the filter has been formed.

(Advantage) The minus filter of this example having an stopping band proximal to 481 nm and 543 nm with respect to a vertically incident light can transmits a light having another wavelength in a visible wavelength region while stopping only the light which has a wavelength proximal to 481 nm and 543 nm.

FIFTH EXAMPLE (Configuration)
There is a multilayer minus filter using $Ta_2O_5$ as a high refractive index material and $SiO_2$ as a low reflective index material, the filter being used for a light incident at 450 and having the following film configuration. Here, a reference wavelength has been indicated by two kinds of expression of 620 nm and 686 nm which become the center wavelengths of the reflection band with respect to a light incident at 0°.

(Expression when λ=620 nm)
0.524H 0.558L 0.559H 0.502L 0.455H 0.466L 0.5H 0.491L
0.526H 0.491L 0.568H 0.474L 0.518H 0.48L 0.495H 0.5L
0.481H 0.447L 0.561H 0.461L 0.584H 0.467L 0.571H
0.445L 0.456H 0.469L 0.475H 0.474L 0.62H 0.439L
0.594H 0.455L 0.574H 0.458L 0.408H 0.489L 0.507H
0.456L 0.604H 0.453L 0.621H 0.472L 0.606H 0.572L
0.593H 0.536L 0.617H 0.452L 0.604H 0.499L 0.612H
0.533L 0.559H 0.532L 0.686H 0.506L 0.549H 0.462L
0.636H 0.527L 0.606H 0.543L 0.526H 0.517L 0.725H
0.477L 0.474H 0.459L 0.331H 0.596L 0.581H 0.654L
0.546H 0.705L 0.649H 0.566L 0.62H 0.668L 0.608H
0.645L 0.567H 0.658L 0.645H 0.605L 0.578H 0.596L
0.413H 0.482L 0.378H 0.534L 0.595H 0.318L 0.448H
0.538L 0.451H 0.54L 0.472H 0.54L 0.471H 0.533L
0.447H 0.521L 0.455H 0.533L 0.498H 0.521L 0.493H
0.544L 0.488H 0.265L (Expression when λ=686 nm)
0.471H 0.504L 0.502H 0.453L 0.409H 0.421L 0.449H
0.443L 0.473H 0.443L 0.511H 0.429L 0.466H 0.433L
0.445H 0.452L 0.432H 0.403L 0.504H 0.417L 0.525H
0.422L 0.513H 0.402L 0.41H 0.424L 0.427H 0.428L
0.558H 0.396L 0.534H 0.411L 0.516H 0.413L 0.367H
0.442L 0.456H 0.412L 0.543H 0.409L 0.558H 0.426L
0.544H 0.517L 0.533H 0.484L 0.554H 0.408L 0.543H
0.451L 0.55H 0.481L 0.503H 0.48L 0.617H 0.457L
0.494H 0.418L 0.572H 0.477L 0.545H 0.49L 0.473L
0.467L 0.652H 0.431L 0.426H 0.414L 0.298H 0.538L
0.522H 0.591L 0.491H 0.636L 0.584H 0.511L 0.558H
0.604L 0.547H 0.582L 0.51H 0.595L 0.58H 0.546L 0.52H
0.539L 0.372H 0.436L 0.339H 0.483L 0.535H 0.287L
0.448H 0.538L 0.451H 0.54L 0.472H 0.54L 0.471H
0.533L 0.447H 0.521L 0.455H 0.533L 0.498H 0.521L
0.493H 0.544L 0.488H 0.265L In the above-described fully 110 layered film configuration, 7th to 38th layers from a substrate form a reflection band in 568 nm with respect to a light beam incident at 45° (reflection band in 620 nm in vertical incidence). An average of the optical thickness of the high refractive index layer when λ=620 nm in the 7th to 34th layers from the substrate is 0.537×λ, and an average of the optical thickness of the low refractive index layer is 0.468. (A sum of the average of the optical thickness of the high refractive index layer and the average of the optical thickness of the low refractive index layer is 1.005, and a ratio thereof is 1.148.) In addition, in the above described fully 110 layered film configuration, the 43rd to 74th layers from the substrate form a reflection band in 633 nm with respect to a light incident at 45° (reflection band in 686 nm in vertical incidence). An average of the optical thickness of the high reflection layer when λ=686 nm in the 53rd to 100 layers from the substrate is 0.52×λ, and an average of the optical thickness of the low refractive index layer is 0.484. A sum of the average of the optical thickness of the high refractive index layer and the average of the film thickness of the low refractive index layer is 1.004, and a ratio thereof is 1.074.

A back face of this multilayer minus filter is non-coated, and a double-sided, polished parallel flat composite quartz glass having φ15×2 mmt has been used for the substrate.

(Function)

Figure 14:
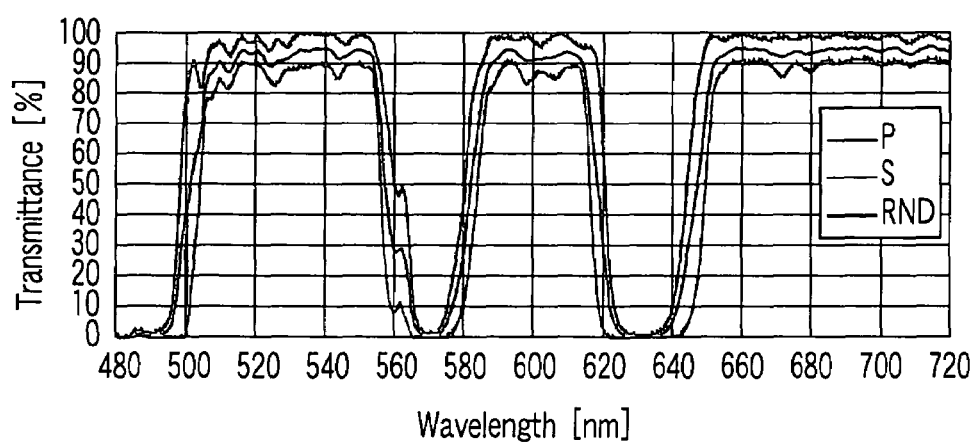
FIG. 14 is a view showing an actual spectral transmittance of a multilayer minus filter in a fifth example.

FIG. 14 shows an actual spectral transmittance of the multilayer minus filter in this example. From FIG. 14, the minus filter of this example has reflection bands proximal to 543 nm and 633 nm with respect to a light incident at 45°. Among them, a reflection band proximal to 543 nm and a reflection band proximal to 633 nm correspond to the minus filter in the invention. Although not explicitly shown, the peaks of a reflection band with respect to a vertically incident light which corresponds to the reflection band proximal to 543 nm and the reflection band proximal to 633 nm appear at 620 nm and 686 nm.

When the multilayer minus filter in this example is produced, ion assisted deposition (IAD) has been used, and the substrate heating temperature (set value) in deposition has been 300° C.

The substrate after film formed has been modified in order of NR=1 to 2 by the measurement using an interfermeter so as to be protruded on the side of a face on which the filter has been formed.

This deformation quantity is a practically problem free deformation quantity.

(Advantage)

The reflection band in the minus filter of this example is compatible with a 488 nm Multi Ar laser, 543 nm Green HeNe laser, and 633 nm Red HeNe laser. This reflection band can be utilized in a confocal laser microscope utilizing these laser beams as light sources. In this manner, these lights of the plurality of wavelengths can be used for excitation of a fluorescence substance at the same time. In addition, plural kinds of fluorescence are observed at the same time, thereby making it possible to respond to a request for precisely observing interactions in cells or layouts of a plurality of observation objects. Such an observation is referred to as a simultaneous observation of multiple dyes. In this simultaneous observation of multiple dyes, a filter (multiple excitation filter) having a plurality of reflection bands (=a plurality of transmission bands) according to the invention is mandatory.

The minus filter according to the embodiment of the invention can supply a filter having a narrower reflection band and a wider transmission band than the above-described multiple excitation filter which has been supplied so far, thus remarkably improving observation performance in the simultaneous observation of multiple dyes.

According to the present invention, there can be provided a multilayer minus filter having a very narrow reflection bandwidth and selectivity of the reflection bandwidth. An optical element comprising the minus filter according to the invention is applied to a fluorescence microscope, thereby making it possible to respond to a high level request in a current fluorescence microscope and remarkably improving its observation performance.

Additional advantages and modifications will readily occur to those skilled in the art. Therefore, the invention in its broader aspects is not limited to the specific details and representative embodiments shown and described herein. Accordingly, various modifications may be made without departing from the scope or scope of the general inventive concept as defined by the appended claims and their equivalents.

What is claimed is:

1. A multilayer minus filter for reflecting a light having at least one reflection wavelength $\lambda_0$ and transmitting a light having a wavelength other than the reflection wavelength $\lambda_0$, the filter comprising:
   a transparent substrate; and
   a repetition layer formed on a surface of the substrate including a plurality of high refractive index layers having an average optical thickness H per layer and a plurality of low refractive index layers having an average optical thickness L per layer, the repetition layer having an alternative stack of high and low refractive index layers, and satisfying the following formulas:

$$1.1 > (H+L)/\lambda_0 > 0.9 \qquad (1)$$

$$2 > H/L > 0.5 \qquad (2)$$

wherein the repetition layer is formed by an ion assisted process technology, and wherein a reflection band utilized with respect to a light incident obliquely on the surface of the filter, the reflection band appearing in reflection wavelength $\lambda_0$ with respect to a light incident vertically on the surface of the filter, utilizes a reflection band with respect to a light incident obliquely on the surface of the filter formed to be shifted on a short wavelength side.

2. The multilayer minus filter according to claim 1, wherein the repetition layer is formed such that average optical thickness of the high refractive index layer is from $0.51\lambda_0$ to $0.62\lambda_0$ and such that average optical thickness of the low refractive index layer is from $0.38\lambda_0$ to $0.49\lambda_0$.

3. The multilayer minus filter according to claim 1, wherein the repetition layer is formed such that average optical thickness of the high refractive index layer is from $0.39\lambda_0$ to $0.48\lambda_0$ and such that average optical thickness of the low refractive index layer is from $0.52\lambda_0$ to $0.62\lambda_0$.

4. A fluorescence microscope comprising the multilayer minus filter according to claim 1.

5. The fluorescence microscope according to claim 4, further comprising a laser as an excitation light source.

6. The multilayer minus filter according to claim 1, wherein an incident angle of the obliquely incident light is used as 45°, the filter including the repetition layer formed such that average optical thickness of the high refractive index layer is from $0.49\lambda_0$ to $0.63\lambda_0$ and such that average optical thickness of the low refractive index layer is from $0.37\lambda_0$ to $0.51\lambda_0$.

7. The multilayer minus filter according to claim 1, wherein an incident angle of the obliquely incident light is used as 45°, the filter including the repetition layer formed such that average optical thickness of the high refractive index layer is from $0.32\lambda_0$ to $0.47\lambda_0$ and such that average optical thickness of the low refractive index layer is from $0.53\lambda_0$ to $0.68\lambda_0$.

8. The multilayer minus filter according to claim 1, wherein the reflection wavelength is selected as a wavelength of a laser light of a laser light source, and only a laser light is reflected.

9. The multilayer minus filter according to claim 1, wherein the multilayer minus filter is a shiftless filter having a small characteristic change caused by an ambient environment, a high refractive index film material configuring the multilayer minus filter is $Ta_2O_5$, $TiO_2$, $Nb_2O_5$, $HfO_2$, $Al_2O_3$, or a mixture including them, and a low refractive index film material is $SiO_2$ or a mixture including it.

10. The multilayer minus filter according to claim 9, wherein the transparent substrate is made of a quartz glass or a glass having a linear expansion coefficient of $0.8 \times 10^{-6}$ or less.

11. The multilayer minus filter according to claim 1, wherein the transparent substrate is heated while applying the ion assisted process technology.

12. The multilayer minus filter according to claim 11, wherein a temperature of the substrate exceeds 200° C. while applying the ion assisted process technology.

* * * * *

UNITED STATES PATENT AND TRADEMARK OFFICE
CERTIFICATE OF CORRECTION

PATENT NO.       : 7,570,428 B2                                      Page 1 of 1
APPLICATION NO. : 11/174628
DATED            : August 4, 2009
INVENTOR(S)      : Tadashi Watanabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Seventh Day of September, 2010

David J. Kappos
*Director of the United States Patent and Trademark Office*